United States Patent [19]

Murakami et al.

[11] 4,254,633
[45] Mar. 10, 1981

[54] CONTROL APPARATUS FOR AN AIR CONDITIONER

[75] Inventors: Hirokuni Murakami, Yamatokouriyama; Hiroshi Horii, Kashihara, both of Japan

[73] Assignee: Matsushita Electric Industrial Co., Ltd., Kadoma City, Japan

[21] Appl. No.: 29,531

[22] Filed: Apr. 12, 1979

[30] Foreign Application Priority Data

Apr. 20, 1978 [JP] Japan .................................. 53/047451
Apr. 20, 1978 [JP] Japan .................................. 53/047452

[51] Int. Cl.³ ...................... F25D 21/06; G05D 23/32
[52] U.S. Cl. ........................................ 62/155; 62/158
[58] Field of Search ................ 62/160, 155, 156, 158, 62/234

[56] References Cited

U.S. PATENT DOCUMENTS

| 3,894,404 | 7/1975 | Stanton | 62/157 X |
|---|---|---|---|
| 3,950,962 | 4/1976 | Odashima | 62/156 |
| 4,142,375 | 3/1979 | Abe et al. | 62/158 |
| 4,151,723 | 5/1979 | Gardner | 62/156 X |

*Primary Examiner*—William E. Wayner
*Attorney, Agent, or Firm*—Cushman, Darby & Cushman

[57] ABSTRACT

A control apparatus for an air conditioner, which selects the operation of the air conditioner between a first mode of warming a room and a second mode of cooling a room, the first mode having a defrosting pause period for defrosting the outdoor heat exchanger, the second mode having a restart-preventing pause period for preventing restarting of a compressor motor, and the abovementioned selection between two modes is made by controlling a logic circuit 16 constituted as a semiconductor IC by applying specified controlling signal thereto.

7 Claims, 8 Drawing Figures

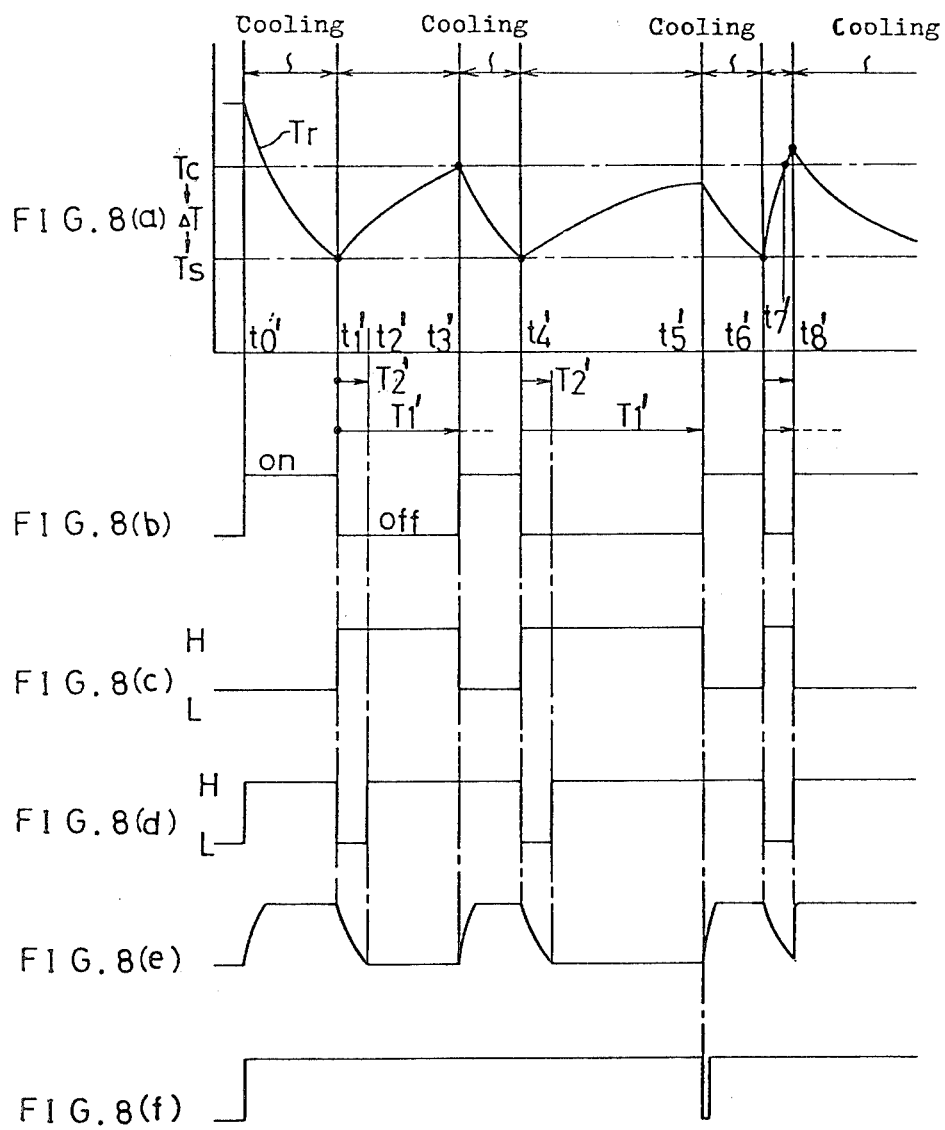

CONTROL APPARATUS FOR AN AIR CONDITIONER

BACKGROUND OF THE INVENTION

1. Field of Invention:

The present invention relates to a control apparatus for an air conditioner which can be operated either with a room cooling operation mode or a room warming operation mode by comprising an IC logic circuit to control the sequence of compressor operation.

2. Prior Art:

The conventional defrosting control in room warming operation mode of an air conditioner has the following shortcomings. In the conventional defrosting control by a mechanical timer comprising a cam and a switch to be driven by a lever following the cam, a temperature detection of an evaporator is made during a short time period (for example 10 minutes) when the lever is falling into the detent part of the cam. The cam is so designed that the abovementioned detection is made with a specified time interval (for example, 1 hour). Then the air conditioner is set into the defrosting operation when the temperature is detected to be lower than a specified value. However, with such system, the detection can be made only for the specified short time period (namely only once for 10 minutes in 1 hour). Therefore, there might be a possibility of belated start of defrosting operation. There is another conventional defrosting system utilizing temperature difference between outdoor temperature and evaporator temperature. Though is very precise, this type of apparatus also has some problem of erroneous detection at the initial starting of the compressor or in a strong wind.

In general, the conventional air conditioners have utilized for room temperature control so-called hydraulic type thermostat which detects temperature change and turns on or off a compressor motor. In accordance with such system, due to a considerable hysteresis gap of temperature and rather slow response speed, a considerable temperature swing, which is larger than the temperature hysteresis gap of the thermostat, takes place in the room temperature. Therefore, the conditioned atmosphere is not satisfactorily comfortable. Especially when the atmosphere is wet and hot, due to effect of swing of moisture on top of that of the temperature, the conventional air conditioned room has not been satisfactorily comfortable. Let us elucidate a little more in detail. By operation of the compressor motor, the temperature and the moisture of the room air decreases. Then, at a detection of a specified lowered room temperature, the compressor is stopped by the function of the thermostat. Then, both the temperature and the moisture increase. Generally speaking, moisture reaches an unpleasant range faster than temperature's reaching an unpleasant range. However, the thermostat makes the compressor start by detection of only a temperature rise, and therefore, the air in the air-conditioned room becomes uncomfortably moist prior to a restoration of operation of the compressor. In order to avoid such inconvenience, there has been a need to provide a measure to restore the compressor motor prior to a detection of a specified temperature when a pausing of the compressor lasts longer than a specified period.

There is another important item in controlling the air conditioner to prevent undesirable locking of compressor which is likely to occur when the compressor is operated to restore immediately after a stopping thereof. Namely, immediately after a stopping the compressor has a very high back-pressure. Therefore, if a compressor motor is energized immediately after a stopping, such high back-pressure hinders the rotation of the motor thereby causing a harmful overloading sometimes leading to a burning of the compressor motor. In order to avoid such inconvenience, there has been a need to provide a mean to prevent a restoration of operation of the compressor immediately after a stopping.

SUMMARY OF INVENTION

The present invention purports to provide an improved control apparatus for an air conditioner comprising a logic circuit which is switched to a cooling mode or a warming and defrosting mode, wherein the switching can be made by controlling the logic circuit in a semiconductor IC for carrying out temperature control, as well as sequences of defrosting and restart prevention, by applying specified mode controlling signal thereto.

BRIEF DESCRIPTION OF THE DRAWINGS

FIG. 8 is a timing chart of a room cooling control mode in the second connection.

DETAILED DESCRIPTION OF PREFERRED EMBODIMENT

A control apparatus for an air conditioner in accordance with the present invention is characterized by comprising:

a thermostat circuit including a temperature detection element and a comparator to issue an output upon detection of a reaching of measured temperature to a predetermined temperature, a timer circuit including a clock generator and a counter, and a logic circuit, said thermostat circuit excluding said temperature detection element, said timer circuit and said logic circuit being formed in a semiconductor IC, said logic circuit having a control terminal to receive a control input for switching logic gates therein thereby selecting connections of the logic circuit between a first connection for defrosting of an outdoor unit in a room heating operation wherein a detection of an output signal from said thermostat is interrupted for a first specified time period, thereafter said counter begins counting of a second specified time period and a switch for reversing a flow direction of a refrigerant gas is actuated upon receipt of either earlier one of output signals from said thermostat circuit and said timer circuit, and a second connection for temperature controlling for a room cooling operation wherein said thermostat circuit controls the actuation of said compressor motor independently from the output of said timer circuit, a hysteresis voltage is given to said thermostat circuit at a stopping of said compressor motor and said timer circuit counts a third specified time period after stopping of said compressor motor.

Figure 1:
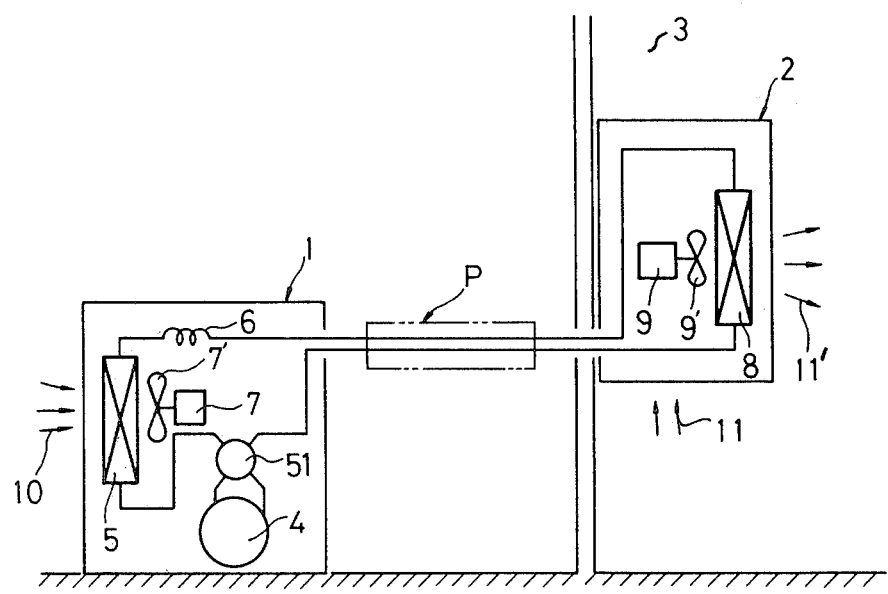
FIG. 1 is a schematical view of a separate-type heat pump air conditioner comprising a control apparatus in accordance with the present invention.

FIG. 1 is a schematical view of a separate-type heat pump air-conditioner comprising a control apparatus in accordance with the present invention. The air conditioner of FIG. 1 comprises an outdoor unit 1, an indoor unit 2 placed in a room 3 to be air-conditioned and a pipe P. The outdoor unit 1 comprises a compressor 4, a four way reversing valve 51, an outdoor heat exchanger 5 (an evaporator in FIG. 1), a capillary tube 6 and a fan motor 7 for driving a fan 7'. The indoor unit 2 comprises an indoor heat exchanger 8 (a condenser in FIG. 1) and a fan motor 9 for driving a fan 9'. The indoor and outdoor units 1 and 2 are connected by a pipe P, through which refrigerant flows between two units 1 and 2. In this first embodiment the separate-type air conditioner is in a warming operation mode and warms the room 3. An air flow 10 generated by the fan 7' and air flows 11 and 11' generated by the fan 9' are also shown in FIG. 1.

Figure 3:
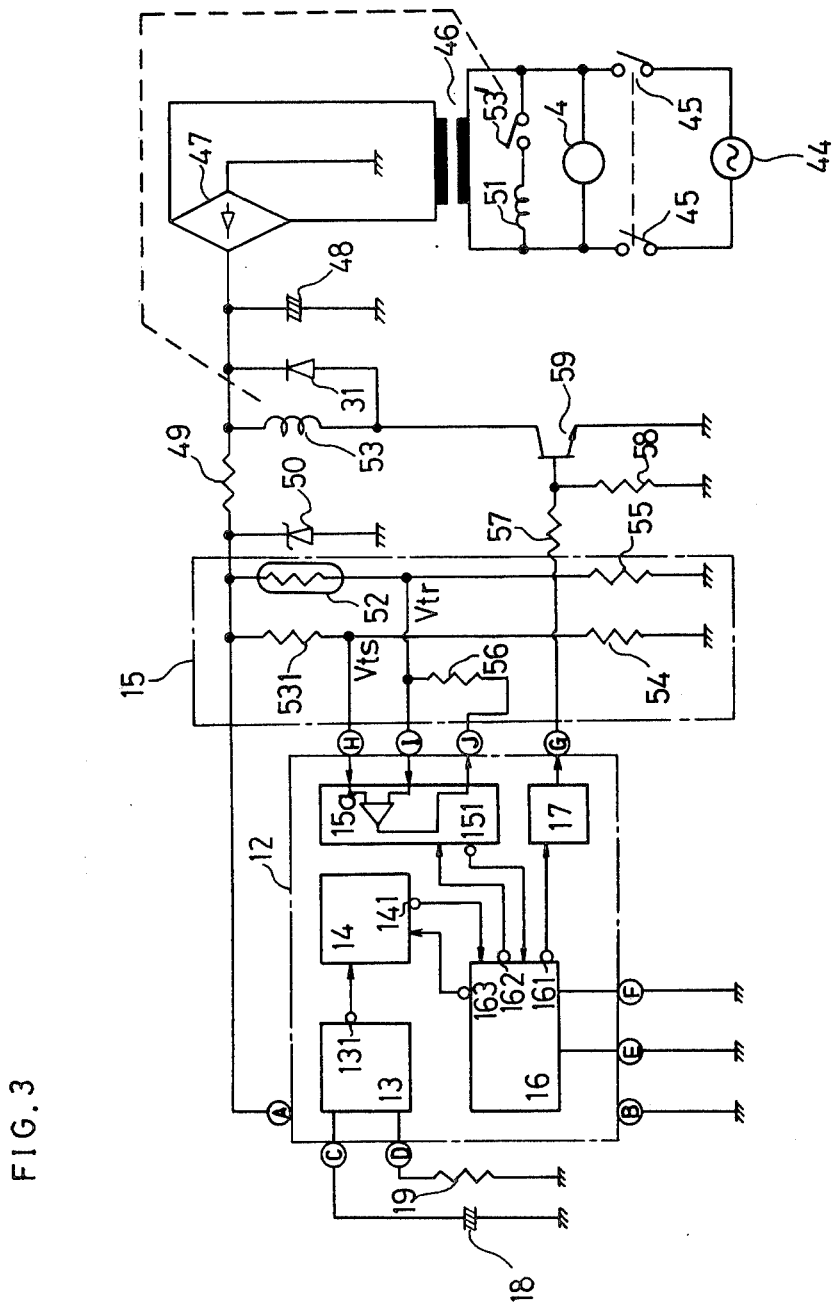
FIG. 3 is an example of electric circuit of a control apparatus of a first connection.

FIG. 3 shows an electric circuit for the temperature control of the air conditioner in the warming operation mode. A semiconductor integrated circuit 12 (hereinafter referred to IC 12) comprises a clock generator 13, a counter circuit 14, a comparator 15a for detection of voltage changes coming out in a thermostat bridge circuit 15, a logic circuit 16 and an output amplifier 17. A timer circuit is constituted by the clock generator 13 and the counter circuit 14. A thermostat circuit is constituted by the comparator 15a and the thermostat bridge circuit 15. The logic circuit 16 sequentially controls the temperature control circuit of FIG. 3 in accordance with clock signals from the clock generator 13. The IC 12 has several connection terminals A, . . . , J. The terminals A and B are used to connect the IC 12 with a power source. The terminals A and B are connected to terminals of the high voltage side H and the low voltage side L of the power source, respectively. A capacitor 18 and a resistor 19, which determine an oscillation frequency of the clock signals, are respectively connected to the terminals C and D. Oscillation waves of a triangular waveform between a high voltage $V_H$ and a low voltage $V_L$ are obtained at terminals across the capacitor 18. The terminal E is a mode selector terminal to select the operation modes between the warming operation mode of the first embodiment and the cooling operation mode of the second embodiment in accordance with the present invention. The mode selection corresponds to the selection of the sequential control mode by the logic circuit 16 by connecting the terminal E to a terminal of logic levels H (high level) or L (low level). The terminal E is grounded to L level in the electric circuit of FIG. 3. This grounding of the terminal E makes the logic circuit 16 in a warming control mode. The terminal F is a reset terminal to reset counting contents of the counter circuit 14. The counting contents are reset when the terminal F is connected to H. The counter circuit 14 is set ready for counting when the terminal F is connected to L. The terminal F is connected to L in the first embodiment. The terminals H and I are input terminals of the comparator 15a. The terminal J is an output terminal of the comparator 15a. The terminal G is an output terminal of a control signal, which controls actuation of the compressor motor and is determined by the selection of the operation mode by use of the mode selector terminal E. The logic circuit 16 sequentially processes logic signals and makes the control signal be issued from the terminal G.

A thermistor 52 serves as a temperature detection element or temperature sensor placed at the outdoor heat exchanger (evaporator in FIG. 1). A relay 53 is for changing over the four way reversing valve 51. When the relay 53 operates, a switch 53' is actuated to change over the four way reversing valve 51 and the air conditioner is turned into the defrosting operation. The air conditioner operates in a warming operation mode when the relay 53 does not operate. A transistor 59 is connected in series with the relay 53. A diode 31 is provided as a surge absorber. Resistors 531, 54 and 55 and the thermistor 52 constitute the thermostat bridge circuit 15. Input terminals of the thermostat bridge circuit 15 are connected to across both terminals of a power source and output terminals thereof are connected to the terminals H and I of the IC 12. The terminal G is connected to the base of the transistor 59 through a resistor 57. A resistor 58 is connected between the base of the transistor 59 and the ground. A commercial power source 44, main switches 45, a power transformer 46, a rectifying diode circuit 47 and a smoothing capacitor 48 constitute a power source circuit. A resistor 49 and a Zener diode 50 stabilize the DC supply voltage.

Figure 2:
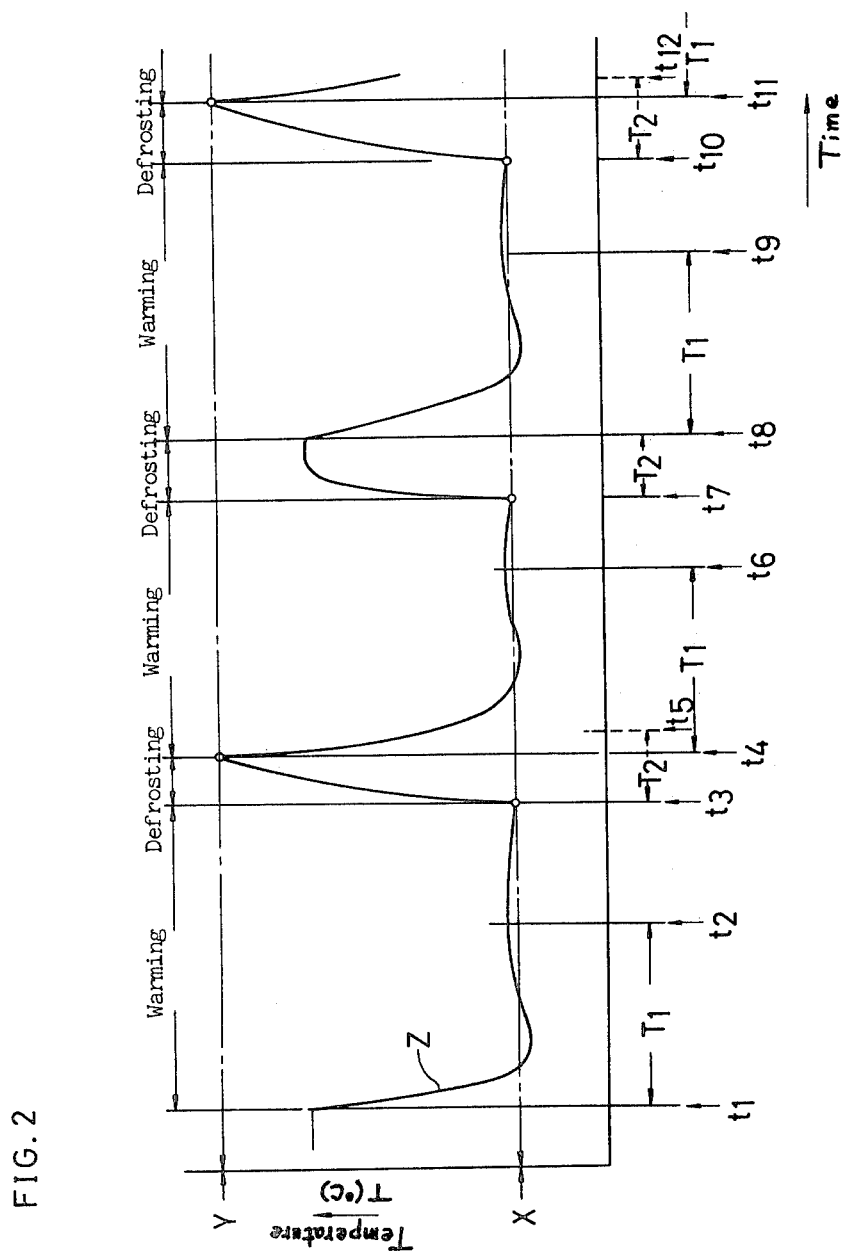
FIG. 2 is a timing chart of a room warming and defrosting control mode in a first embodiment of the present invention.

The operation of the heat pump air conditioner is controlled by the control circuit of FIG. 3 as follows. When the main switch 45 is turned on, the compressor 4 begins operation and DC voltage is supplied to the control circuit of FIG. 3. Sequential operation of the heat pump air conditioner is controlled by the logic circuit 16 as shown in FIG. 2. In FIG. 2, time is indicated on the abscissa and temperature is indicated on the ordinate. The temperature of the outdoor heat exchanger 5 (evaporator in FIG. 1) in the outdoor unit 1 first decreases and overshoot surpassing defrosting beginning temperature as shown by a curve Z. But during a time period $T_1$ from $t=t_1$ to $t=t_2$, an output signal level of the comparator 15a is nothing to do with the defrosting operation by the control of the signal from the terminal 162 of the logic circuit 16. After this overshooting, the temperature of the outdoor heat exchanger 5 becomes stable at a temperature range above the defrosting beginning temperatue X. The overshooting time period is substantially so short that the outdoor heat exchanger 5 is not covered with frost during the overshooting time period.

After the time period $T_1$ the control signal from the terminal 162 of the logic circuit 16 controls the detection of the output signal from the comparator 15a, and temperature detection begins by the signal from the terminal 151. Then the outdoor heat exchanger 5 is gradually covered with frost and the temperature of the outdoor heat exchanger 5 slowly decreases along with growth of the frost covering the outdoor heat exchanger 5. This temperature is detected by the thermistor 52. A voltage Vtr at a connection point of the thermistor 52 and the resistor 55 varies in accordance with the temperature measured by the thermistor 52 at the outdoor heat exchanger 5. The resistors 531 and 54 divide the power voltage giving rise to a voltage Vts at a connection point of the resistors 531 and 54. The voltages Vtr and Vts are impressed to the comparator 15a via the input terminals H and I, respectively, and are compared with each other. When the measurement temperature T is higher than the defrost beginning temperature X, the voltage Vtr is higher than the voltage Vts and the output level of the comparator 15a is L. On the contrary, the voltage Vtr is lower than the voltage Vts and the output signal level of the comparator 15a is H, when the measurement temperature T is lower than the defrosting beginning temperature X. The defrosting beginning temperature X and a defrosting end temperature Y are preset by selecting resistance values of the resistors in the thermostat bridge circuit 15. When the temperature of the outdoor heat exchanger 5 again reaches the defrosting beginning temperature X at $t=t_3$, the signal level of the output terminal J is inverted to L. The logic circuit 16 receives this level inversion information from the terminal 151. Upon receiving the level inversion information, output signal from the output terminal 163 of the logic circuit 16 sets the counter circuit 14 to count a defrosting time period $T_2$. At the same time the logic circuit 16 issues a H signal from a terminal 161. The H signal from the terminal 161 is amplified by the output amplifier 17 and put out from the terminal G. Accordingly, the transistor 59 turns on and the relay 53 is actuated thereby closing the interlocked switch 53'. The four way reversing valve 51 is changed over and hot refrigerant gas flows from the compressor 4 through the outdoor heat exchanger 5 thereby defrosting the outdoor heat exchanger 5. Therefore, the air conditioner is set into the defrosting operation mode.

Once the air conditioner begins the defrosting operation, the temperature of the outdoor heat exchanger 5 rises and reaches the defrosting end temperature Y at $t=t_4$. The temperature of the outdoor heat exchanger 5 at the defrosting end temperature is detected by the thermistor 52. Accordingly, at $t=t_4$, upon detection of the temperature rise, the signal level of the output terminal J is again inverted to H and the logic circuit 16 receives this inversion information from the terminal 151. Upon receiving the level inversion information, the logic circuit 16 issues an L signal from the terminal 161. The L signal from the terminal 161 is amplified by the output amplifier 17 and put out from the terminal G. Accordingly, the transistor 59 turns off and the relay 53 is actuated thereby closing the interlocked switch 53'. The four way reversing valve 151 is again changed over and the refrigerant gas stops flowing from the compressor 4 through the outdoor heat exchanger 5. Therefore, the air conditioner is again set into the warming operation mode. At the same time the counter circuit 14 is reset and stops counting halfway without finishing the whole counting of the defrosting time period $T_2$ at $t=t_5$. At this moment (at $t=t_4$) circuit state of the control circuit of FIG. 3 returns to the initial state and thereafter the control circuit repeats the abovementioned sequential control operation.

The defrosting operation mode is usually terminated as described above when the temperature of the outdoor heat exchanger 5 reaches the defrosting end temperatue Y. Moreover, the defrosting operation mode is also terminated when the counter circuit 14 finishes the counting of the defrosting time period $T_2$ at $t=t_8$ after the air conditioner sets into the defrosting operation mode at $t=t_7$. This case occurs when the strong wind is blowing against the outdoor unit 1 and therefore the temperature rise of the outdoor heat exchanger 5 saturates below the defrosting end temperature Y without reaching the defrosting end temperature Y within the defrosting time period $T_2$ after $t=t_7$. This situation is also illustrated in FIG. 2.

Therefore, the termination of the defrosting operation is so controlled that the air conditioner stops the defrosting operation when one of the abovementioned conditions for the defrost end temperature Y and the defrosting time period $T_2$ is fulfilled. This is electrically controlled by an OR gate in the logic circuit 16 by processing signals corresponding to the detection of the defrosting end temperature Y by the thermistor 52 and to the counting of the defrosting time period $T_2$ by the counter circuit 14. Accordingly, the air conditioner stops the defrosting operation when an output signal is obtained from the OR gate in the logic circuit 16.

The logic circuit 16 controls the sequential control in such a manner that the processing of detection signal of the temperature at the outdoor heat exchanger 5 is interrupted in the logic circuit 16 for the specified time period $T_1$ after the air conditioner begins the warming operation. And the logic circuit 16 is ready for the detection of the defrosting beginning temperature X after the time period $T_1$.

In a temperature-difference-type defrosting control apparatus, in which a temperature difference between the outdoor atmospheric temperature and the temperature of the outdoor heat exchanger (evaporator) actuates the defrosting beginning, it is possible to rightly determine the defrosting beginning time by introducing a relatively long time period as $T_1$ for a suspending time during which starting of the defrosting is suspended.

Figure 4:
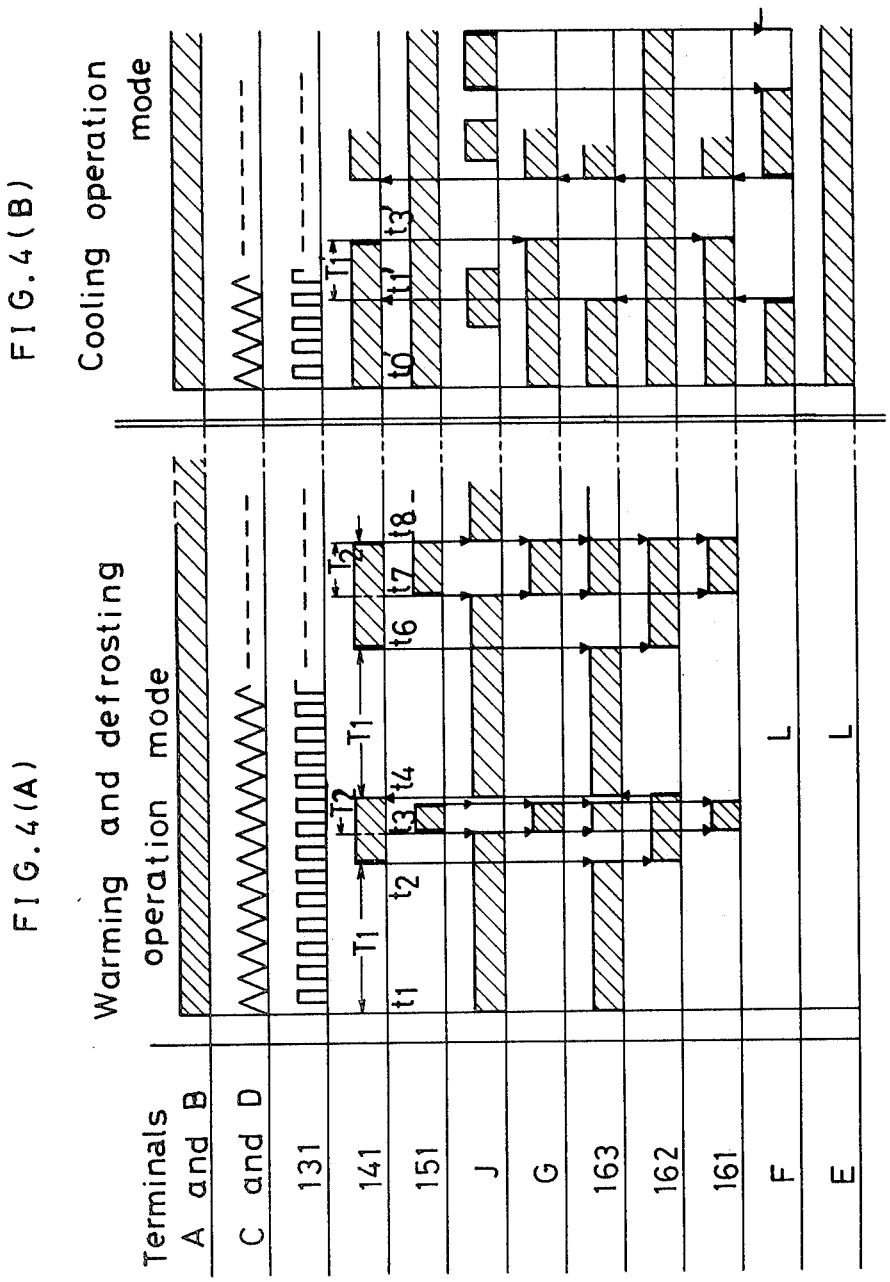
FIG. 4 is a sequential timing chart of several parts in the control apparatus, wherein (A) is for that of FIG. 3 and (B) is for that of another embodiment of the present invention.

The overall sequential operation of the warming and defrosting operation mode is illustrated in FIG. 4(A), wherein signal states at the several terminals in the IC 12 are shown. They are for the power current receiving terminals A and B, the oscillation time constant terminals C and D, the output terminal 131 of the clock generator 13, the output terminal 141 of the counter circuit 14, the output terminal 151, the output terminal J of the comparator 15a, the output terminal G of the output amplifier 17, the output terminals 163, 162 and 161 of the logic circuit 16, and the reset terminal F and the mode selection signal input terminal E of the logic circuit 16, from top to bottom. The signal states shown by the hatched area for the terminals A and B correspond to a state that the terminals A and B are connected to the power source. The signal state expressed by the triangular wave form correspond to a state that the oscillation signal of the triangular wave form is obtained between two terminals C and D. The signal states at other terminals are expressed by the hatched area for their respective signal being H. The causal relation in the sequential operation by the logic circuit 16 is shown by the vertical arrows in FIG. 4.

The sequential operation by the logic circuit 16 was elucidated above in detail, and accordingly, only the summary thereof is described in the following. When the terminals A and B are connected to the power source, the counter circuit 14 begins the counting of the clock signal from the clock generator 13. The signal from the terminal 162 of the logic circuit 16 interrupts the temperature detection signal from the thermostat bridge circuit 15 entering into the logic circuit 16 via the terminal 151. After the first specified time period $T_1$ the output signal from the output terminal 162 releases the interruption of the temperature detection signal from the thermostat bridge circuit 15 entering into the logic circuit 16, and then the logic circuit 16 is ready for the detection of the defrosting beginning temperature X. When the defrosting beginning temperature X is detected and the detection signal is fed into the logic circuit 16, then the counter circuit 14 is again actuated to count the second specified time period $T_2$. The signal states of the logic circuit 16 are restored by the control signal fed earlier among two signals for the detection of the defrosting end temperature Y and for the end of the counting of the second specified time period $T_2$.

Figure 5:
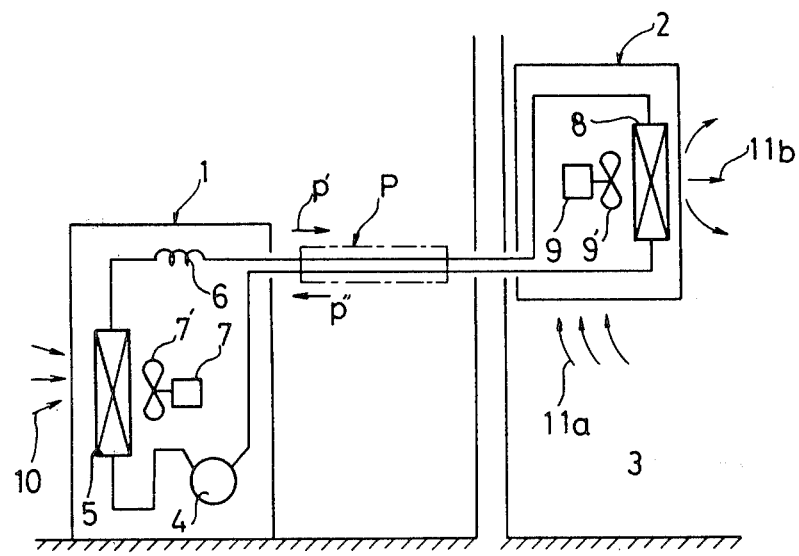
FIG. 5 is a schematical view of a separate type air conditioner for room cooling comprising the control apparatus in accordance with said another embodiment of the present invention.

A second connection is elucidated in the following by referring to FIGS. 5, 6, 7 and 8. FIG. 5 shows a separate-type air conditioner comprising an outdoor unit 1, an indoor unit 2 placed in a room 3 to be air-conditioned and a pipe P. The outdoor unit 1 is a refrigerating machine comprising a compressor 4, an outdoor heat exchanger 5 (a condenser in FIG. 5), a capillary tube 6 as a pressure reducing unit, and a fan motor 7 for driving a fan 7' for the outdoor heat exchanger. The indoor unit 2 comprises an indoor heat exchanger 8 (an evaporator in FIG. 5) and a fan motor 9 for driving a fan 9' for the indoor heat exchanger. The indoor and outdoor units 1 and 2 are connected by a pipe P, through which refrigerant flows between two units 1 and 2 along directions p' and p''. In this embodiment the separate-type air conditioner is in a cooling operation mode and cools the room 3. An air flow 10 generated by the fan 7' and air flows 11a and 11b generated by the fan 9' are also shown in FIG. 5.

Figure 6:
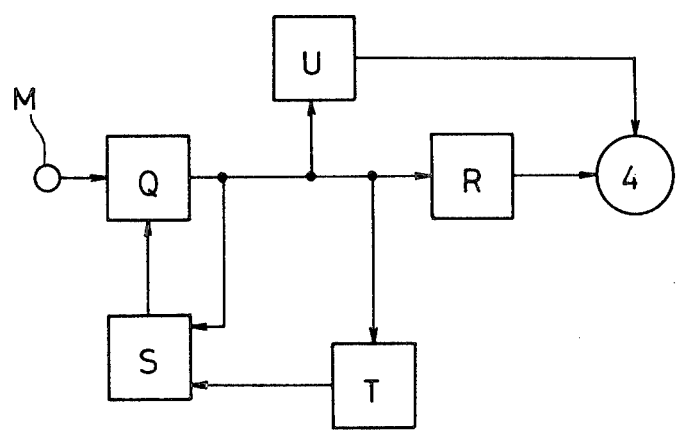
FIG. 6 is a block diagram for illustrating a temperature control by the control apparatus of the second connection.

FIG. 6 is a block diagram showing a temperature control flow chart in the separate-type air conditioner in accordance with the second embodiment of the present invention. A temperature detector M detects the temperature in the room 3. A thermostat circuit Q compares the temperature measured by the temperature detector M with a preset temperature. A switching circuit R starts or stops the compressor 4 in accordance with an output signal of the thermostat circuit Q. A hysteresis circuit S gives a hysteresis value to the thermostat circuit Q. A timer circuit T counts a time period for controlling the operation of the compressor 4 in accordance with the output signal of the thermostat circuit Q. A control circuit U controls starting of the compressor 4 in accordance with the output signal of the thermostat circuit Q. The thermostat circuit Q and the timer circuit T are constituted by a semiconductor integrated circuit 12 (hereinafter referred to IC 12) shown in FIG. 7.

The operation of the separate-type air conditioner in the cooling operation mode is now elucidated in detail with reference to the block diagram showing the temperature control flow chart of FIG. 6 and a temperature control timing chart of FIG. 8.

When the temperature Tr measured by the temperature detector M is higher than a specified temperature Ts (hereinafter referred to OFF temperature Ts), an on-signal is put out from the thermostat circuit Q. This on-signal actuates the switching circuit R thereby operating the compressor 4. Then, the thermostat circuit Q puts out an off-signal when the measurement temperature Tr in the air-conditioned room 3 is decreased to the OFF temperature Ts. Accordingly, the off-signal turns off the switching circuit R thereby stopping the operation of the compressor 4. A hysteresis temperature $\Delta T$ in the operation of the thermostat is determined by a hysteresis circuit S, and a specified temperature Tc (hereinafter referred to ON temperature Tc) is set be equal to $(Ts + \Delta T)$. Then, the thermostat-circuit Q issues the on-signal when the measurement temperature Tr in the air-conditioned room 3 reaches the ON temperature Tc. The on-signal again actuates the switching circuit R thereby operating the compressor 4. When the thermostat circuit Q then issues the off-signal as a next sequential step, the timer circuit T starts time counting. After lapse of a first counting time period $T_1'$, the timer circuit T issues a signal to make the hysteresis temperature $\Delta T \approx 0$, and the thermostat circuit Q issues the on-signal if the measurement temperature Tr in the air-conditioned room 3 is higher than the OFF temperature Ts. The measured temperature Tr in the air-conditioned room 3 is usually higher than the OFF temperature Ts at a time after the compressor 4 stops the operation.

The first counting time period $T_1'$ is selected to be shorter than a time period after the compressor 4 stops and before one feels uncomfortable due to a rise of humidity. The selection of the first counting time period $T_1'$ is also made by in a manner that the compressor 4 should not be turned on and off frequently. The first counting time period $T_1'$ is found to be suitable around 8 minutes by several experimental measurements. The control circuit U starts the operation thereof at the same time when the thermostat Q issues the off-signal, and the control circuit U prohibits restart of the operation of the compressor 4 within a second time period $T_2'$. The second time period $T_2'$ is selected to be a time period, during which period the pressure in the cylinder of the compressor 4 restores a state suitable for a smooth restart of the compressor 4. The second time period $T_2'$ is necessary for the compressor 4, in order to prevent restarting of the compressor motor immediately after a stop thereby to avoid an undesirable overloading due to a locking of the compressor. The selection of the second time period $T_2'$ depends on the characteristics of the compressor 4 and is found to be suitable between 2.5—3 minutes by several experimental results. Therefore the first counting time period $T_1'$ is set to be longer than the second time period $T_2'$ in the second embodiment in accordance with the present invention.

Figure 7:
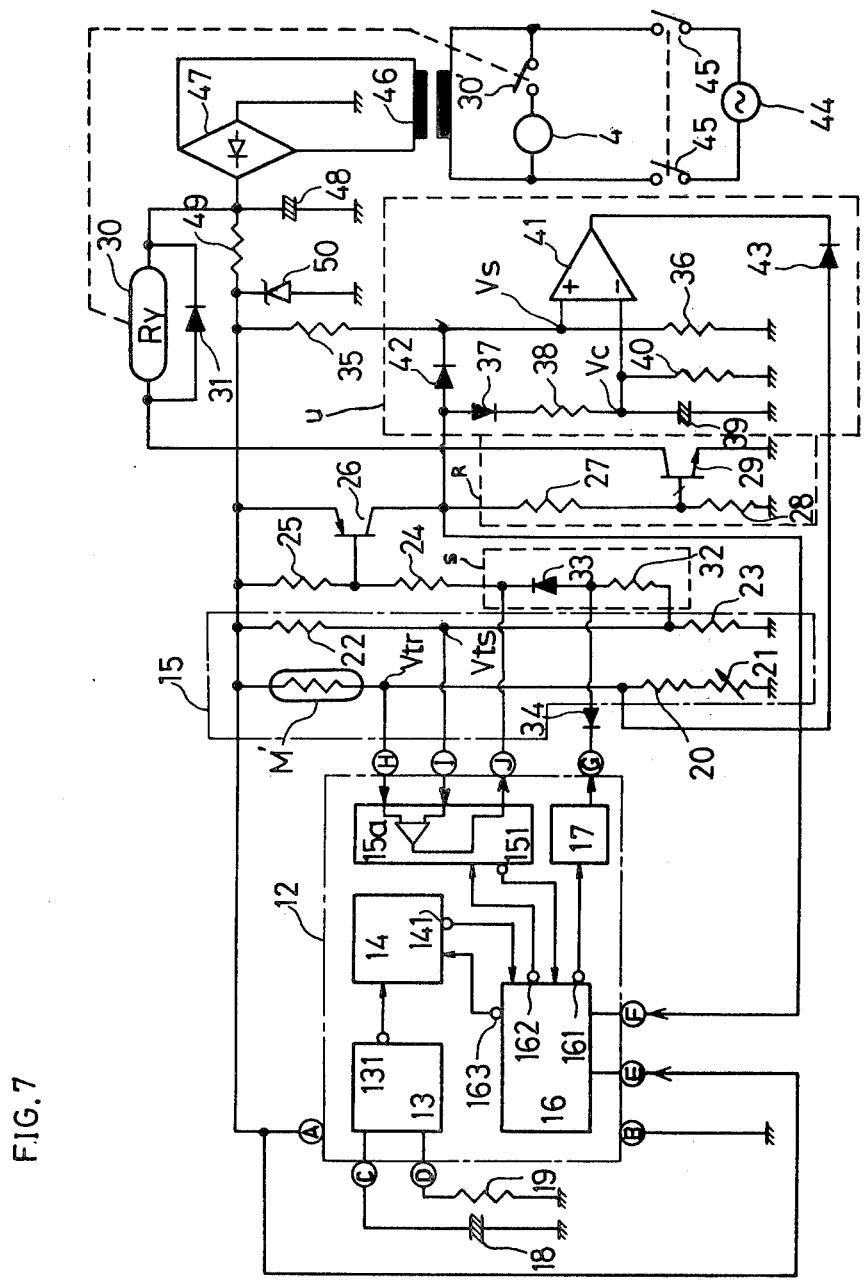
FIG. 7 is an electric circuit of the control apparatus of the control apparatus of the second connection.

FIG. 7 is an electric circuit for the temperature control of the air conditioner for the cooling operation mode. The circuit corresponds to the block diagram of FIG. 6. The thermostat circuit Q and the timer circuit T are constituted in the IC 12. The IC 12 comprises a clock generator 13, a counter circuit 14, a comparator 15a for detection of voltage changes coming out in a thermostat bridge circuit 15, a logic circuit 16 and an output amplifier 17. The logic circuit 16 sequentially controls the temperature control circuit of FIG. 7 in accordance with clock signals from the clock generator 13. The IC 12 has several connection terminals A, . . . , J. The terminals A and B are used to connect the IC 12 with a power source. The terminal A and B are connected to terminals of the high voltage side H and the low voltage side L of the power source, respectively. A capacitor 18 and a resistor 19, which determine an oscillation frequency of the clock signals, are respectively connected to the terminals C and D. Oscillation waves of a triangular waveform between a high voltage $V_H$ and a low voltage $V_L$ are obtained at terminals across the capacitor 18. The terminal E is a mode selector terminal to select the operation modes between the warming mode of the first embodiment and the cooling mode of the second embodiment in accordance with the present invention. The mode selection is equivalent to the selection of the sequential control mode by the logic circuit 16 by connecting the terminal E to a terminal of logic levels H (high level) or L (low level). The terminal E is grounded to H level in the electric circuit of FIG. 7. This grounding of the terminal E makes the logic circuit 16 in the cooling operation mode. The thermostat bridge circuit 15 and the timer circuit T composed by the clock generator 13 and the counter circuit 14 independently operate in the cooling mode.

The terminal F is a reset terminal to receive a reset signal to reset counting contents of the counter circuit 14. The counting contents are reset when the terminal F is connected to a terminal of H level. The counter circuit 14 is set ready for counting when the terminal F is connected to the terminal L. The terminals H and I are input terminals of the comparator 15a. The terminal J is an output terminal of the comparator 15a. The terminal G is an output terminal of a control signal, which is determined by the selection of the operation mode by use of the mode selector terminal E. The logic circuit 16 sequentially processes logic signals and issues the control signal from the terminal G.

The operation of the IC 12 is as follows. The clock signals of the clock generator 13 from an output terminal 131 is fed in the counter circuit 14. A counting signal of the counter circuit 14 from an output terminal 141 is fed to the logic circuit 16. An output signal from an output terminal 151 is also fed to the logic circuit 16. The logic circuit 16 issues an output logic signal from an output terminal 161 to the output amplifier 17 after processing the input signals in the predetermined sequential order. The logic circuit 16 also issues control signals for the comparator 15a and the counter circuit 14 from an output terminal 162 and an output terminal 163, respectively. The abovementioned sequential control by the logic circuit 16 will be elucidated below.

The temperature control of the air-conditioned room in the cooling mode is now elucidated in detail. The mode selector terminal E is connected to H in the cooling mode as described above. A thermistor M' detects the temperature of the air-conditioned room 3. The thermostat bridge circuit 15 comprises the thermistor M', a resistor 20, a variable resistor 21 and resistors 22 and 23. The OFF temperature Ts is variable by the variable resistor 21. A voltage Vtr at a connection point of the thermistor M' and the resistor 20 varies responding to the measured temperature Tr by the thermistor M'. A voltage Vts at a connection point of the resistors 22 and 23 is constant (the power voltage is divided by two resistors 22 and 23). The voltages Vtr and Vts are impressed to the comparator 15a via the input terminals H and I, respectively, and are compared with each other. When the measurement temperature Tr is higher than the OFF temperature Ts, Vtr is higher than Vts and the output level of the comparator 15a is L. On the contrary, Vtr is lower than Vts and the output signal level of the comparator 15a is H when Tr is lower than Ts. Accordingly, the temperature control circuit of FIG. 7 is so designed that the compressor 4 is driven when the logic level at the terminal J is L. The compressor 4 stops when the logic level at the terminal is H.

When the output logic level of the comparator 15a becomes L, a transistor 26 turns on. A resistor 24 is connected between the terminal J and the base of the transistor 26. A resistor 25 is connected between the positive power source line and the base of the transistor 26. Then a transistor 29 turns on. A resistor 27 and a resistor 28 are connected in series between the collector of the transistor 26 and the ground. A relay 30 then turns on and an interlocked switch 30' is closed thereby operating the compressor 4. A diode 31 is for a surge absorber. A resistor 32 and a diode 33 constitute the hysteresis circuit S. When the output logic level of the comparator 15a is L, the resistor 32 and the diode 33 are connected in parallel to the resistor 23. In this case the power voltage is divided by the resistor 22 and the electric component part formed by the resistors 23 and 32 and the diode 33, thus resulting the voltage Vts at the terminal I.

When the compressor 4 operates, the transistor 26 is on and accordingly the logic level at the terminal F connected with the collector of the transistor 26 is H. The counter circuit 14 is therefore reset and does not count the clock signals from the output terminal 131 of the clock generator 13. At this time the logic level at the terminal G of IC 12 is H and is not impressed on the hysteresis circuit S since a diode 34 is reverse-biased.

The control circuit U comprises a comparator 41, to which a voltage Vs and a voltage Vc are applied. The power voltage is divided by resistors 35 and 36 giving rise to the voltage Vs. A diode 37, a resistor 38 and a capacitor 39 are connected in series between the collector of the transistor 26 and the ground. The voltage Vc is obtained at the connection point of the resistor 38 and the capacitor 39. An output logic level of the comparator 41 is H when Vs>Vc and is L when Vs<Vc. When the compressor 4 operates, the transistor 26 is on and therefore the capacitor 39 is charged via the transistor 26, the diode 37 and the resistor 38.

During the while the transistor 26 is on, a diode 42 connected between the collector of the transistor 26 and one terminal of the comparator 41 is forward-biased, thereby raising Vs up to a voltage nearly equal to the power source voltage. Therefore, Vs>Vc and the output signal of the comparator 41 is H. A diode 43 is reverse-biased at this time and the output signal of the comparator 41 does not affect the voltage Vtr in the thermostat bridge circuit 15. The air conditioner continues the cooling operation as long as the measured temperature Tr is higher than the OFF temperature Ts.

Once the measured temperature Tr becomes lower than the OFF temperature (the corresponds to the relationship Vtr<Vts), the output signal at the terminal J becomes H. Accordingly, the transistor 26 turns off thereby turning off the transistor 29. The relay 30 is then turned off thereby opening the switch 30'. Therefore, the compressor 4 stops the cooling operation. On the other hand, the diode 33 of the hysteresis circuit S is reverse-biased and the resistor 32 is electrically separated from the resistor 23. At this moment the voltage Vts at the terminal I becomes a voltage V'ts which is higher than Vts since the power voltage is divided by two resistors 22 and 23 (when the compressor 4 operates, the signal at the terminal J is L and the resistor 32 and the diode 33 are connected in parallel to the resistor 23). The difference voltage $\Delta V(=V'ts-Vts)$ corresponds a hysteresis temperature $\Delta T$. Accordingly, the measurement temperature Tr is then compared with the ON temperature Tc $(=Ts+\Delta T)$ and the signal at the terminal J is H as long as the measurement temperature Tr is lower than the ON temperature Tc.

When the transistor is off, the diodes 37 and 42 are reverse-biased and the input voltage of the comparator 41 in the control circuit U become the voltage Vs. The power voltage is divided by the resistors 35 and 36 resulting in the voltage Vs. The resistance of the resistors 35 and 36 is so selected that the voltage Vs is higher than the charged voltage at the capacitor 39. Therefore, the output signal of the comparator 41 is L. The output terminal of the comparator 41 is connected to the diode 43 which is forward-biased, thereby short-circuiting the series circuit formed by the resistor 20 and the variable resistor 21. Accordingly, the voltage Vtr at the terminal H decreases, resulting in the relationship Vtr<<Vts. This does not affect the signal state H of the output signal from the comparator 15a and therefore the compressor 4 does not operate.

On the other hand, the capacitor 39 begins discharging through the resistor 40 at the time when the transistor 26 turns off. The output signal of the comparator 41 holds L level until the charging voltage Vc of the capacitor 39 becomes lower than Vs. In other words, the operation of the switching circuit R is interrupted for the second time period $T_2$ which is determined by the discharging time constant of the capacitor 39 and the resistor 40 and by the voltage Vs. The restart of the compressor 4 is therefore prevented for the second time period $T_2'$ from the stop of the compressor 4 in order to obtain smooth restarting of the compressor motor.

When the room temperature rises and the measured temperature Tr becomes higher than the ON temperature Tc after the output signal of the comparator 41 in the control circuit U turns from L to H (i.e. after the second time period $T_2'$), the compressor 4 restarts the cooling operation. At this time the difference voltage $\Delta V$ ($=V'ts-Vts$) corresponding to the hysteresis temperature $\Delta T$ is set equal to zero thereby making Tc (Ts+$\Delta T$) equal to the OFF temperature Ts. The compressor 4 again operates as described above until the measurement temperature Tr reaches the OFF temperature Ts.

In case that the measured temperature Tr of the air-conditioned room slowly rises after the compressor 4 stops the operation and that the atmosphere of the room becomes uncomfortable one due to rapid rise of humidity in the air-conditioning room even before the measured temperature Tr reaches the ON temperature Tc, the compressor 4 restarts the operation when the counter circuit 14 finishes counting of the first counting time period $T_1'$. The counter circuit 14 becomes ready for and begins the counting of the clock signals from the clock generator 13, when the transistor 26 turns off and therefore the logic level of the reset terminal F turns from H to L. When the counter circuit 14 finishes the counting of the first counting time period $T_1'$, the output voltage at the terminal G becomes L and the resistor 32 is grounded through the diode 34. Therefore, the hysteresis voltage $\Delta V$ is set to equal zero. At this moment, the output voltage at the terminal J becomes L and the transistor 26 turns on thereby actuating the compressor 4 and resetting the counter circuit 14.

In case that the measured temperature Tr becomes higher than the ON temperature Tc after the second time period $T_2'$ (after the locking prevention time period for the compressor 4 controlled by the control circuit U) but before the hysteresis voltage $\Delta V$ is set to be equal to zero (before the counter circuit 14 finishes the counting of the first counting time period $T_1'$), the compressor 4 is actuated to operate and at the same time the counter circuit 14 is reset.

FIG. 8 shows the room cooling operation control states controlled by the control circuit of FIG. 7. FIG. 8(a) shows one example of the change of the temperature in the air-conditioning room. FIG. 8(b) shows on- and off- states of the compressor 4. FIG. 8(c) shows output signal states of the comparator 15a. FIG. 8(d) shows output signal states of the comparator 41 in the control circuit U. FIG. 8(e) shows voltage levels of the voltage across the terminals of capacitor 39. FIG. 8(f) shows output signal levels at the output terminal 141 of the counter circuit 14.

Sequential cooling operation is now elucidated by one control example of FIG. 8. When the main switches 45 are turned on at $t=t_0'$, the output signal level of the comparator 15a is L since the measured temperature Tr is higher than the OFF temperature Ts, and hence the compressor 4 is actuated to begin the cooling operation. The output signal level of the comparator 41 turns to H at this moment ($t=t_0'$). The capacitor 39 in the control circuit U is then charged as shown by FIG. 8(e).

The measured temperature Tr in the air-conditioning room decreases by the cooling operation of the compressor 4. Then the compressor 4 turns off, when the measured temperature Tr reaches the OFF temperature Ts at $t=t_1$ and the output signal level of the comparator 15a turns to H. At this moment the voltage Vtr at the terminal I rises by the amount of the hysteresis voltage $\Delta V$ and the ON temperature Tc is set. The output signal level of the comparator 15a is held H until the measured temperature Tr rises to the ON temperature Tc. The output signal level of the comparator 41 in the control circuit U becomes L at $t=t_1'$ and the capacitor 39 begins discharging as shown by FIG. 8(e). Restarting of the compressor 4 is prevented during the second time period $T_2'$ determined by the control circuit U. On the other hand, the counter circuit 14 begins the counting of the first counting time period $T_1'$ at $t=t_1'$. After lapse of the second time period $T_2'$, the output signal level of the comparator 41 turns to H (FIG. 8(d)) at $t=t_2'$. When the measured temperature Tr surpasses the ON temperature Tc at $t=t_3'$, the output signal level of the comparator 15a turns to L thereby actuating the cooling operation by the compressor 4. At this time the counter circuit 14 is reset.

In case that the room temperature in the air-conditioning room slowly rises after $t=t_4'$, the output signal level of the counter circuit 14 turns to L (FIG. 8(f)) at $t=t_5'$ that is after lapse of the first counting time period $T_1'$ from $t=t_4'$. At this time $t_5'$ the hysteresis voltage $\Delta V$ is set to be equal to zero thereby changing the detection of the ON temperature Tc by the thermostat bridge circuit 15 into that of the OFF temperature Ts. Therefore, the output signal level of the comparator 15a turns to L thereby actuating the cooling operation of the compressor 4. Then the measured temperature Tr rapidly rises after the compressor 4 stops at $t=t_6'$, and exceeds the ON temperature Tc at $t=t_7'$. But the operation of the compressor 4 is prevented within the second time period $T_2'$ (from $t=t_6'$ to $t=t_8'$) every time after stopping of the cooling operation of the compressor 4. Within the second time period $T_2'$ (within the discharging time of the capacitor 39), the output signal level of the comparator 41 in the control circuit U is L thereby preventing the restarting of the compressor 4. This prevention during the second time period $T_2'$ is also applied to the cases that the operation of the compressor 4 is manually terminated by opening the main switches 45 or by varying the resistance of the variable resistor 21.

As described above, the counter circuit 14 begins the counting of the first counting time period at the moment when the compressor 4 stops. But the cooling operation control circuit of FIG. 7 can be modified in such a manner that the counter circuit begins the counting of the first counting time period $T_1'$ after lapse of the second time period $T_2'$ determined by the control circuit U.

The overall sequential operation of the cooling operation mode is illustrated in FIG. 4(B), wherein signal states at the several terminals in the IC 12 are shown in the similar manner as in FIG. 4(A).

The sequential control in the cooling operation mode is summarized as follows: The signal level at the terminal E is H and the output signal voltage of the comparator 15a directly comes out at the terminal J by the control of the output signal from the output terminal 162 of the logic circuit 16. In the cooling operation mode the output voltage level from the terminal 151 is always H. When the output voltage level at the terminal 151 is H, the logic circuit 16 has nothing to do with the output signal from the comparator 15a. Therefore, the output signal at the terminal J is the output signal of the comparator 15a which signal is independent from the counting operation of the counter circuit 14. The counting operation of the counter circuit 14 is controlled by the signal level of the voltage applied to the reset terminal F. The counting output from the terminal 141 of the counter circuit 14 comes out at the output terminal G through the logic circuit 16 and the output amplifier 17.

When the signal voltage level at the reset terminal F is H, the counter circuit 14 is reset. On the contrary, the counter circuit 14 begins counting when the signal voltage level at the reset terminal F becomes L. By controlling the application time and time period of the signal voltage levels to the reset terminal F, it is possible to control the counting operation of the counter circuit 14. The control circuit of FIG. 7 is therefore characterized in that the output voltage of the comparator 15a as a result of the temperature detection by the thermostat bridge circuit 15 is utilized for the control of the cooling operation mode independent from the counting operation of the counter circuit 14.

In summary, the present invention has the following distinctive features:

(1) The IC 12 comprises the clock generator 13, the counter circuit 14 and the logic circuit 16 for the air conditioners. The IC 12 is applicable for two control modes in the cooling operation and the warming and defrosting operation. In addition, high reliability and miniature size of the control circuit for the air conditioners can be realized by use of the IC 12.

(2) The control circuit of the air conditioner in accordance with the present invention is adaptable in the control operation since the counting operation of the counter circuit 14 is controllable by use of the reset terminal F of the IC 12.

(3) The oscillation frequency of the clock generator 13 is controllable by the resistor 18 and the capacitor 19, and therefore the counting operation is adaptable in the control operation.

(4) The response of the temperature detection by the control circuit in accordance with the present invention is fast. Therefore, in the cooling operation mode the swing of the temperature variation in the air-conditioning room can be made small. Moreover, the cooling operation gives rise to satisfactory results by making the hysteresis temperature equal to almost zero after the specified time period (the cooling operation by the hysteresis temperature is introduced in the cooling operation mode by taking into account the rise of the humidity in the air-conditioning room).

(5) In the cooling operation mode the restart of the compressor is prevented during the specified time period after the compressor stops. Accordingly the compressor is protected from the overload thereby giving rise to the smooth and efficient operation of the air conditioner.

(6) The warming and defrosting operation by the control circuit in accordance with the present invention has the following advantages over the conventional control system using a hydroulic type thermostat and a timer constituted by several cams. The control circuit of the present invention continuously detects the temperature of the evaporator after the specified operation time period. Accordingly the time necessary for the defrosting operation is correctly detected leading to the precise defrosting operation and to the elevation of the efficiency of the heat exchanger.

What we claim is:

1. A control apparatus for an air conditioner comprising:

a thermostat circuit including a temperature detection element and a comparator to issue an output upon detection of a reaching of measured temperature to a predetermined temperature, a timer circuit including a clock generator and a counter, and a logic circuit, said thermostat circuit excluding said temperature detection element, said timer circuit and said logic circuit being formed in a semiconductor IC, said logic circuit having a control terminal to receive a control input for switching logic gates therein thereby selecting connections of the logic circuit between a first connection for defrosting of an outdoor unit in a room heating operation wherein a detection of an output signal from said thermostat circuit is interrupted for a first specified time period, thereafter said counter begins counting of a second specified time period and a switch for reversing a flow direction of a refrigerant gas is actuated upon receipt of an earlier one of respective output signals from said thermostat circuit and said timer circuit, and a second connection for temperature controlling for a room cooling operation wherein said thermostat circuit controls the actuation of said compressor motor independently from the output of said timer circuit, a hysteresis voltage is given to said thermostat circuit at a stopping of said compressor motor and said timer circuit counts a third specified time period after stopping of said compressor motor.

2. A control apparatus for an air conditioner in accordance with claim 1, wherein said IC has a reset terminal to receive an input to reset said counter.

3. A control apparatus for an air conditioner in accordance with claim 1, wherein a capacitor and a resistor for determining a frequency of said clock generator are provided outside said IC and connected thereto.

4. A control apparatus for an air conditioner in accordance with claim 1, wherein said hysteresis voltage is made zero, after counting of said third specified time period by said counter after stopping of said compressor motor.

5. A control apparatus for an air conditioner in accordance with claim 1 further comprising a control circuit and a capacitor, said control circuit being for prevention of the operation of said compressor motor for a fourth specified time period after said capacitor begins discharging.

6. A control apparatus for an air conditioner in accordance with claim 1, wherein
said temperature detection element is for detection of a temperature at an outdoor heat exchanger.

7. A control apparatus for an air conditioner in accordance with claim 5, wherein said counter is for counting said fourth specified time period after said third specified time period.

* * * * *